Aug. 23, 1932.   R. J. NORTON   1,872,796
BRAKE STRUCTURE
Filed Feb. 17, 1931

Inventor
RAYMOND J. NORTON
M. W. McConkey and
By  Semmes & Semmes
Attorneys

Patented Aug. 23, 1932

1,872,796

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE STRUCTURE

Application filed February 17, 1931. Serial No. 516,407.

This invention relates to brake structures and more particularly to a brake assemblage having a novel engaging frictional surface.

The usual type of brake apparatus now employed on automotive vehicles comprises a low carbon stamped steel drum. Positioned within this drum is a pressed steel shoe on which is attached a friction material adapted to frictionally engage an adjacent surface of the drum. The friction material usually comprises a woven or felted asbestos lining. In order that this type of structure operate efficiently, the curvature of the brake drum and friction material must be substantially the same, and must be maintained equal and at low tolerance throughout operation. This necessitates a relatively accurate machining of the drum and buffing or grinding of the friction surface.

These brake drum structures transform the kinetic energy developed by the vehicle into heat. It is therefore essential that the heat developed in braking action be withdrawn from the friction surfaces and dissipated as rapidly as possible.

It is an object of the present invention to provide a brake structure in which the frictional engaging surfaces of the drum rotor and stator are uniform and further characterized by the high degree of dissipation from the heat generating surfaces.

Another object is to provide a brake drum structure the frictional engaging portions of which are all molded materials of high thermal conductivity.

Yet another object is to provide a brake drum having synthetic resin frictionally engaging surfaces of high thermal conductivity.

With these and other equally important objects in view, the invention comprises a brake structure including a drum and a cooperating non-rotating member upon each of which is formed a molded friction surface of high thermal conductivity so that the generated heats of friction may be dissipated by two methods and in two directions, namely through the medium of the drum and also through the medium of the shoe.

In order to make the invention more readily understood, a typical embodiment is shown in the accompanying drawing, in which.

Figure 1:
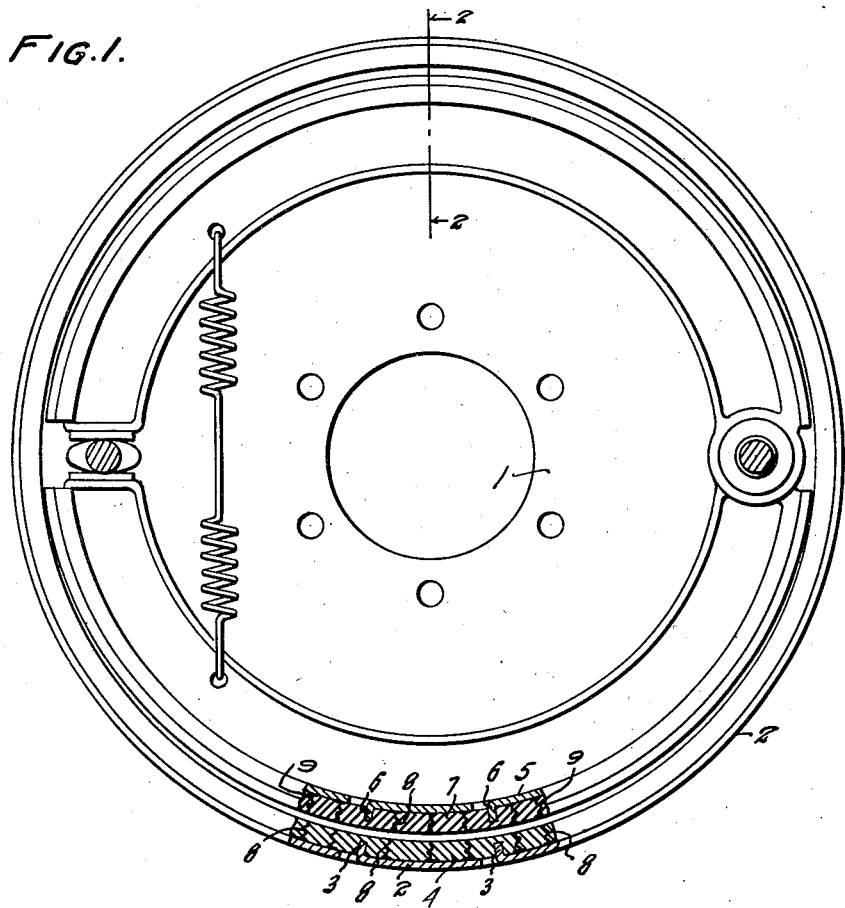
Figure 1 is a side elevation of the brake assemblage.

According to the present invention the difficulties of accurately stamping the brake drum and of subsequent machining this member to obtain the desired curvature are largely obviated. The machining of a relatively hard steel member is rather difficult. According to the present invention this is obviated, and such machining as is necessary involves only the buffing of the friction facings. According to the preferred modification, the frictional engaging surfaces are molded directly upon the shoe and the drum so as to secure the advantage of accuracy of molding operations and in addition to this the friction material is made highly conductive.

The friction surface preferably comprises a felted asbestos bonded with a synthetic resin. These synthetic resins may comprise resins of the phenol-methylene type or other similar synthetic material, such as furfural, etc. As noted hereinbefore, these friction materials are so manufactured as to render them thermally conductive. Normally, as is known, the synthetic resins are not only poor conductors of heat but are substantially heat insulators. For this reason the heat which is generated at the frictional engaging surfaces of these members is not conducted away with any great rapidity. This is the major disadvantage because such materials are deleteriously affected by heat. If the temperatures reach a very high degree decomposition and ultimate destruction follow.

The friction materials of the present invention may be made up by impregnating woven or felted fibrous material with the fusible form of the resin and transforming the material to the infusible form under pressure.

At any suitable stage during the manufacture a relatively large number of wires of suitable gauge are incorporated in the friction material so that they extend transversely therethrough and provide a multitude of paths of high thermal conductivity from the frictional engaging surface back to the adjacent metallic structure. In this type of brake, therefore, while the frictional engaging surfaces considered generally and in toto are non-metallic, yet, nevertheless, there is provided a continuous metallic path from the frictional engaging surfaces to the metallic surfaces of the drum and the shoe respectively. The heat is then rapidly conducted to all parts of the drum and shoe, from which it is dissipated by radiation and convection.

After the thermal conductors have been incorporated in the friction materials, preferably while the materials are still in plastic or fusible state, they are then molded under pressure and preferably upon the drum and the shoe in final shape. If desired the materials may be treated for a prolonged period at 60° C. more or less to preshrink the friction surfaces and to more accurately secure the desired clearance.

A structure such as that described is shown in the drawing. In these the assemblage may comprise a brake drum including a head 1 and a continuous laterally extending breaking flange 2. This flange may be provided with integral projections indicated generally at 3, which serve to retain the friction surface 4 in position and which also take the circumferential thrusts of brake application and transmit them to the body of the drum. The friction surface 4 may be applied to the metal of the drum in any desired manner, such as that described in copending application Serial No. 445,508, filed April 18, 1930. In this molding operation, as described, the metal of the drum may be utilized to form one section of the mold.

The non-rotating brake member may comprise a substantially T-shaped brake shoe formed with angularly extending projections 6. The rigidifying web of the shoe may be extended quite a distance downwardly so as to decrease the heat dissipated surface area and thereby serve as additional means for cooling the drum. The shoe, similar to the structure of the drum, may be formed with projections 6 which serve to hold the friction material in position and also to take braking thrusts. The shoe member may be made up in any desired manner as, for example, according to the method described in copending application, Serial No. 324,362, filed December 7, 1928.

Figure 2:
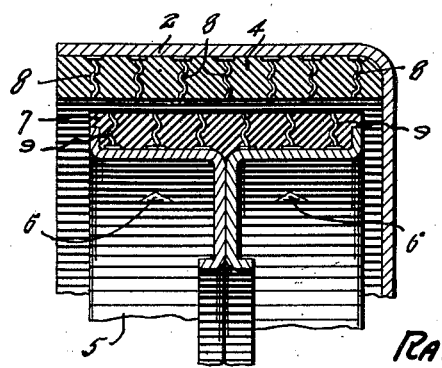
Figure 2 is a section taken on line 2—2 of Figure 1.

As noted hereinbefore, the friction facings on the drum and the shoe are provided with metallic wires extending from the frictional engaging surface back to abutting relationship with the metal of the drum or the shoe. These are clearly shown in Figure 2, the thermal conductors on the drum being designated at 8 and those on the shoe at 9.

The frictional characteristic of the present type of drum may be considerably modified by proper choice of the respectively contacting friction surfaces. Thus, for example, if it is desired to decrease the coefficient of friction, one or both of the friction surfaces may be permanently lubricated in the manner described in copending application 361,012, filed May 6, 1929. This permanent lubrication may be achieved by impregnating the fibre embodying the resin with a lubricating oil or with a powdered lubricant, such as graphite. If it is desired to increase the retardation, the coefficient of friction of the friction material may be increased by including suitable finely divided solids. If desired, to one of the friction facings may be imparted a high coefficient of friction and to the other a low coefficient. Obviously also, if desired, the friction surface secured to the drum may have incorporated therein a larger number of wires than the material on the shoe, for the drum, being a rotating member, is naturally the best potential heat dissipator since it is subjected to high velocity convection currents, while the internal shoe is not.

In this manner, therefore, a novel type of brake, operating in a novel manner, is secured. In place of the old method of retardation by a metal to non-metal frictional engagement, the new method involves a non-metal to non-metal frictional engagement. Furthermore, the peculiar types of non-metallic friction surface described present a wide permissive variation in frictional characteristics, and hence in braking effects. Thus, two frictional surfaces, 4 and 7, may be made up of the same resins or of different resins; one may be a resin bonded woven asbestos, and the other a resin bonded felted asbestos. One or both of these surfaces may be permanently lubricated, or one or both may be treated to increase the coefficient of friction. In any case the efficiency of the structure is increased and longevity insured by conducting away the generated frictional heats from the frictional engaging surface and transmitting them by the best method, namely conduction, to metallic surfaces which are dissipative areas.

While there is described a particular embodiment of the invention, it is to be understood that this is merely given for the purpose of explaining the principles herein involved. The novelty is considered to reside broadly in the provision of a new method of braking or retardation by providing for non-metallic to non-metallic frictional contact, the generated frictional heats resulting from which are rapidly dissipated.

I claim:

1. A brake mechanism comprising a stator and a rotor, each having highly heat conductive synthetic resin frictional surfaces.

2. A brake mechanism comprising rotatable and non-rotatable parts and highly heat conductive resin bonded friction surfaced molded on each part.

3. A brake mechanism comprising rotatable and nonrotatable parts and highly heat conductive synthetic resin bonded asbestos linings on each part.

4. A brake mechanism comprising rotatable and nonrotatable parts, a non-metallic friction surface attached to each part, each friction surface being formed with a plurality of paths of high thermal conductivity extending from the friction engaging surface to a metallic backing member.

5. A brake mechanism comprising rotatable and nonrotatable parts, the respectively adjacent surfaces of the parts comprising non-metallic portions, each of said non-metallic portions having metallic inserts extending transversely therethrough for conducting away generated heats of friction and each of which portions are permanently lubricated.

6. A brake mechanism comprising rotatable and nonrotatable parts, the respectively adjacent surfaces of the parts comprising bonded asbestos materials in which wires are incorporated and which wires extend transversely therethrough, one of said portions having a higher coefficient of friction than the other.

7. A brake mechanism comprising rotatable and nonrotatable parts, the respectively adjacent surfaces of the parts comprising resin bonded asbestos facings, each facing being provided with paths of high thermal conductivity extending transversely therethrough and at least one of said facings having a lubricant permanently embodied therein.

8. A brake mechanism comprising rotatable and nonrotatable parts, the respectively adjacent surfaces of the parts comprising resin bonded asbestos facings, each of said facings being provided with metallic paths of high thermal conductivity extending transversely therethrough and said facings being further characterized by differential coefficients of friction.

9. A brake mechanism comprising a drum having a friction surface molded thereon and a cooperating shoe having a friction surface molded thereon, the said friction surfaces comprising resin bonded asbestos material in which is incorporated metallic means for directly transmitting generated heats of friction from the frictional engaging surface to the metal of the drum and the shoe respectively.

In testimony whereof, I have hereunto signed my name.

RAYMOND J. NORTON.